Patented July 16, 1946

2,403,922

UNITED STATES PATENT OFFICE 2,403,922

CATALYTIC HYDROCARBON REACTIONS

Wendell P. Hawthorne, Wenonah, N. J., assignor to Socony-Vacuum Oil Company, Incorporated, a corporation of New York Application November 22, 1944, Serial No. 564,629

4 Claims. (Cl. 260—683.4)

This invention relates to a method for conducting synthetic hydrocarbon reactions in the presence of a liquid acid catalyst and is particularly concerned with a preferred embodiment involving alkylation of isoparaffins with olefins in the presence of liquid hydrogen fluoride.

The invention is directed to a method of conducting the processes disclosed and claimed in applications Serial Nos. 481,430 and 490,487, filed April 1, 1943, and June 11, 1943, respectively. According to the earlier of the said applications, reactions such as alkylation and polymerization are conducted in the presence of such liquid acid catalysts as sulfuric acid, hydrogen fluoride and phosphoric acid by injecting the feed hydrocarbons in vapor phase to a liquid phase catalyst. The later of said applications shows advantages obtained by supplying the feed hydrocarbons, in either vapor or liquid phase, at a temperature in excess of that at which the catalyst is maintained. According to either of these processes, a rather heavy heat exchange load is imposed on the system for removal of heat of condensation or sensible heat or both; in addition to the heat of reaction encountered in processes of this type.

It is a primary object of the present invention to provide a method of contacting vapor phase charge hydrocarbons; preferably heated to a temperature above that of the catalyst; to a body of liquid phase catalyst. The method provides for simultaneously abstracting heat from the contacting zone and supplying the desired heat to charge hydrocarbons for vaporization, and heating of vapors if desired, by indirect heat exchange of liquid charge hydrocarbons with liquids in the contacting zone under conditions to induce vaporization of the charge hydrocarbons. This expedient takes advantage of the high latent heat of vaporization to achieve high efficiency cooling and at the same time achieve the necessary vaporization of the charge.

Figure 1:
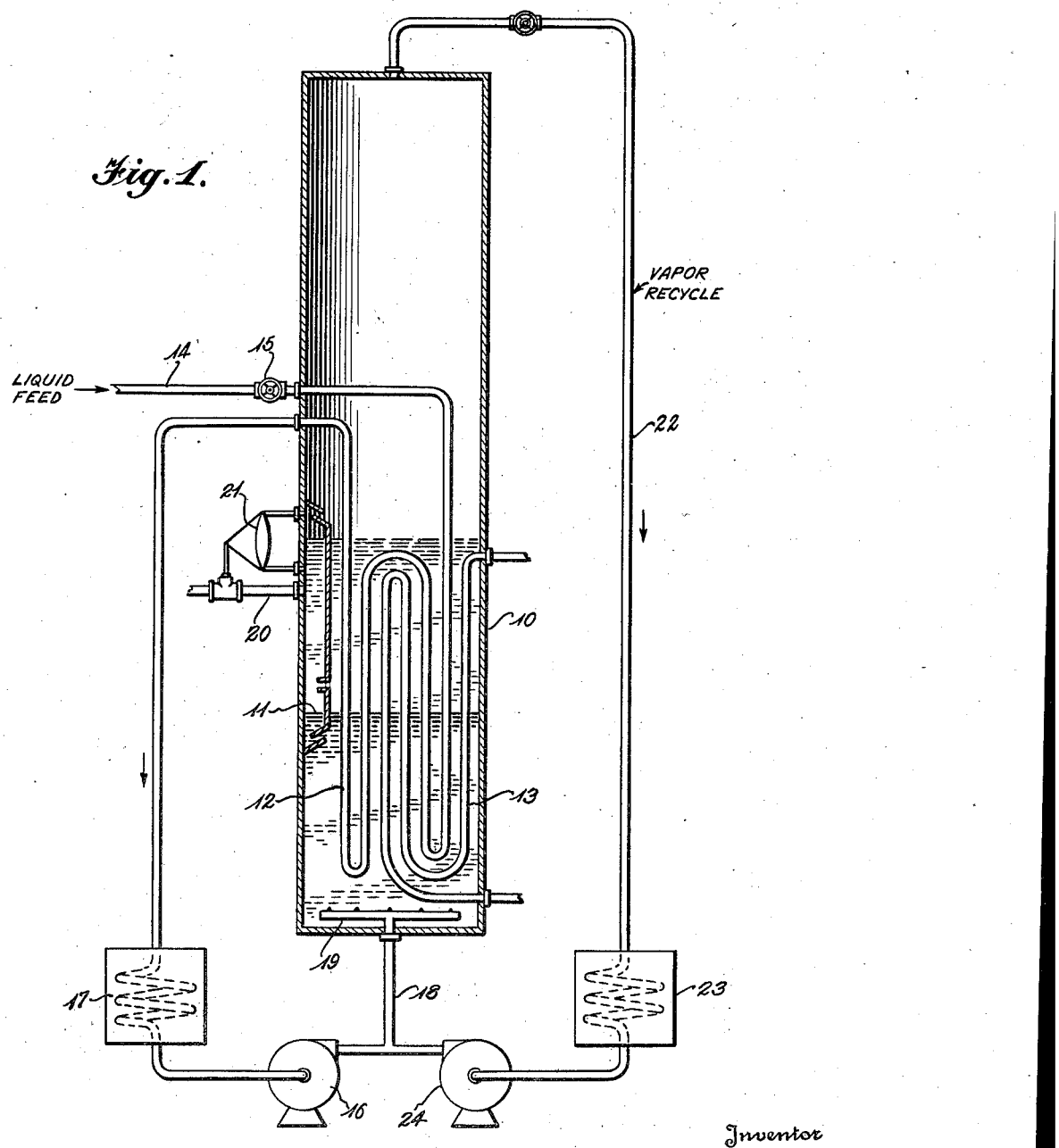
Figure 2:
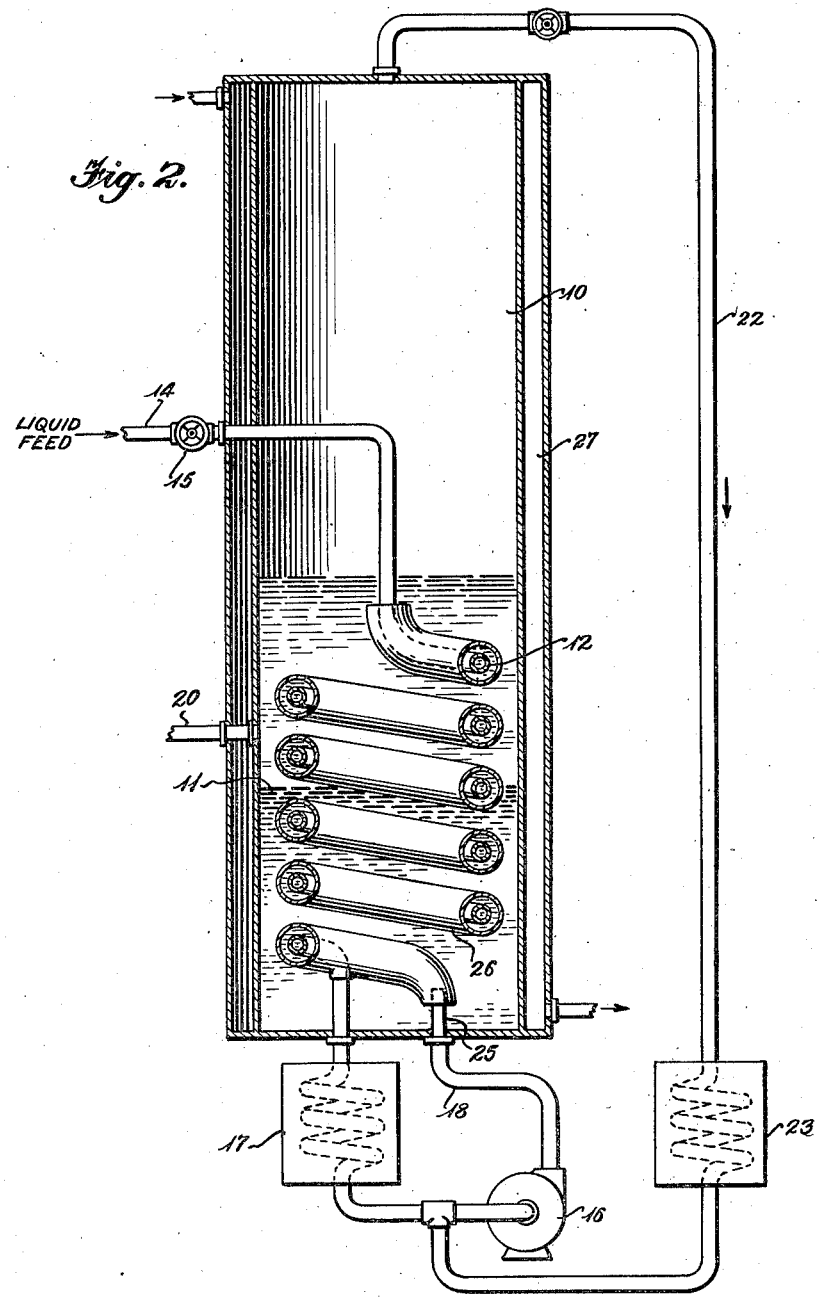

Further objects and advantages of the invention will be apparent from the discussion below of preferred embodiments of the invention adapted for practice in apparatus shown in the annexed drawings, wherein:

Figure 1 is a diagrammatic view of a reactor for alkylation in the presence of hydrogen fluoride according to the invention; and Figure 2 is a vertical section of a reactor structure using a double coil heat exchanger.

Referring specifically to Figure 1, a body of liquid hydrogen fluoride occupies the lower portion of an alkylation tower indicated generally at 10. A layer of liquid hydrocarbons overlies the acid, forming an interface therewith at 11. Immersed in the liquid within tower 10 are two cooling coils 12 and 13; of which coil 12 is adapted to receive liquid phase feed from line 14 through an expansion valve 15. The feed is expanded to a pressure suitable to induce vaporization in coil 12, thus taking up latent heat of vaporization and cooling the liquids in tower 10. The coil 13 is connected to a suitable source of cooling medium, such as plant cooling water or a refrigeration system and serves to absorb the heat in excess of that taken up by vaporization of feed in coil 12.

The vapor phase feed is conducted from the outlet of coil 12 to a compressor 16, preferably by way of a heat exchanger 17. The heat of compression in compressor 16 serves to supply a considerable portion of the preheat normally desired in operation of the system, but it is usually advisable to adjust the temperature in heat exchanger 17. The preheated compressed feed from compressor 16 passes by line 18 to an atomizer, such as the atomizing plate 19 in the bottom of tower 10. The atomized charge rises through the liquid hydrogen fluoride, which is of sufficient depth to provide a residence time suitable for satisfactory alkylation. In general, the system should provide for a residence time of at least about 5 seconds. Although the invention contemplates longer residence times, such periods may vary between about 5 and 90 seconds with good results.

As the hydrocarbons, unreacted feed components, and alkylate reach interface 11, they merge into the layer of hydrocarbons above the interface and further reaction is substantially inhibited. The liquid hydrocarbons are withdrawn by line 20 under the control of liquid level controller 21 and transferred to conventional equipment for recovery of product and separation of unreacted hydrocarbons, acid catalyst and heavy ends in the usual manner.

The tower 10 is preferably operated under a temperature and pressure such that a fairly large proportion of unreacted hydrocarbons (principally isobutane in alkylation of isobutane with butenes) and hydrogen fluoride will pass from the hydrocarbon layer in vapor phase. Any hydrocarbons that can be removed without condensation materially reduce the heat exchange load and evaporation of hydrogen fluoride aids in heat control by requiring latent heat of vaporization. These vapors, containing a small amount of heavier hydrocarbons, pass from the top of the tower by vapor line 22, through heat exchanger 23 and compressor 24 to the charge feed line 18, from which they are again admitted to the tower 10. The vapors from line 22 may be condensed in whole or part, cooled and supplied by way of feed line 14 after separation of liquid hydrogen fluoride for separate return.

The embodiment of Figure 2 employs a double coil heat exchanger in which the reaction mixture in an outer tube is cooled by heat exchange with an inner tube in which the charge is vaporized and with a bath of hydrogen fluoride in which the reaction coil is immersed. The reaction is induced in a dispersion of acid catalyst and reactants formed by injecting vaporous reactants from line 18 through a nozzle 25 in the open end of reaction tube 26. The stream of reactants acts to draw catalyst from the liquid body surrounding tube 26 and efficiently disperse the reactants in the flowing stream so induced. The liquid feed is admitted to inner coil 12 through expansion valve 15 from feed line 14 and is vaporized in coil 12 to cool the reaction mixture. A cooling medium is also circulated in heat exchange relationship with the body of catalyst, as by jacket 27, thus providing a cooling bath about reaction coil 26. The feed vaporized in coil 12 and vapor recycle from line 22 are handled in much the same manner as in Figure 1.

In a typical run, the alkylation was conducted at about 80° F. and 100 pounds per square inch absolute by maintaining tower 10 at about those conditions. The vaporous charge was admitted to contact with the catalyst at 200° F. and 150 pounds per square inch absolute and comprised 90 weight per cent of isobutane and 10 weight per cent of butene. The advantages of the invention are strikingly illustrated by these typical conditions. Even if the system is operated to remove all hydrocarbons, including unreacted excess isobutane, in liquid phase; about half of the cooling required for cooling the reaction zone is supplied by vaporization of charge. About 75% of the heat required for vaporization and preheating of charge is derived from heat exchange with the reaction mass. Where a large proportion of unreacted isobutane is withdrawn from the reaction zone in vapor phase, in accordance with preferred practice, the cooling load is greatly reduced, since condensation of vapors is the greatest factor. Under these conditions, a correspondingly larger share of the cooling effect is obtained from vaporizing of the charge in heat exchange relationship with the reaction mass.

I claim:

1. In a process for synthesizing valuable hydrocarbon products by exothermic reaction of an isoparaffin and an olefin in the presence of liquid hydrogen fluoride, the steps which comprise maintaining a reaction zone containing said liquid hydrogen fluoride under conditions favorable to said reaction such that the products of said reaction will be predominantly liquid and the reactants will be predominantly vaporous, introducing to said liquid hydrogen fluoride a vapor phase feed containing isoparaffin and olefin prepared as hereinafter described to thereby induce said reaction with formation of a liquid product while permitting unreacted material to remain predominantly in the vapor phase, removing liquid hydrocarbons from said reaction zone and recovering the product therefrom, preparing a liquid phase fresh charge mixture containing isoparaffin and olefin, vaporizing and expanding said charge mixture in indirect heat exchange relationship with said liquid hydrogen fluoride to thereby cool said reaction zone, withdrawing vaporous unreacted hydrocarbons from said reaction zone and mixing them with said vaporized charge mixture to form said vapor phase feed and introducing said vaporized feed to said liquid hydrogen fluoride as aforesaid.

2. The process of claim 1 wherein said isoparaffin is isobutane and said olefin is butene.

3. In a process for synthesizing valuable hydrocarbon products by exothermic reaction of an isoparaffin and an olefin in the presence of liquid hydrogen fluoride, the steps which comprise maintaining a reaction zone containing said liquid hydrogen fluoride under conditions favorable to said reaction such that the products of said reaction will be predominantly liquid and the reactants will be predominantly vaporous, introducing to said liquid hydrogen fluoride a vapor phase feed containing isoparaffin and olefin prepared as hereinafter described to thereby induce said reaction with formation of a liquid product while permitting unreacted material to remain predominantly in the vapor phase, removing liquid hydrocarbons from said reaction zone and recovering the product therefrom, preparing a liquid phase fresh charge mixture containing isoparaffin and olefin, vaporizing and expanding said charge mixture in indirect heat exchange relationship with said liquid hydrogen fluoride to thereby cool said reaction zone, withdrawing vaporous unreacted hydrocarbons from said reaction zone and mixing them with said vaporized charge mixture to form said vapor phase feed and introducing said vaporized feed to said liquid hydrogen fluoride as aforesaid; said vapor phase feed being adjusted to a temperature in excess of the temperature of said liquid hydrogen fluoride before introduction thereto.

4. The process of claim 3 wherein said isoparaffin is isobutane and said olefin is butene.

WENDELL P. HAWTHORNE.